8354X
J. Martineau,
Stone Pavement,
Patented Aug. 11, 1834
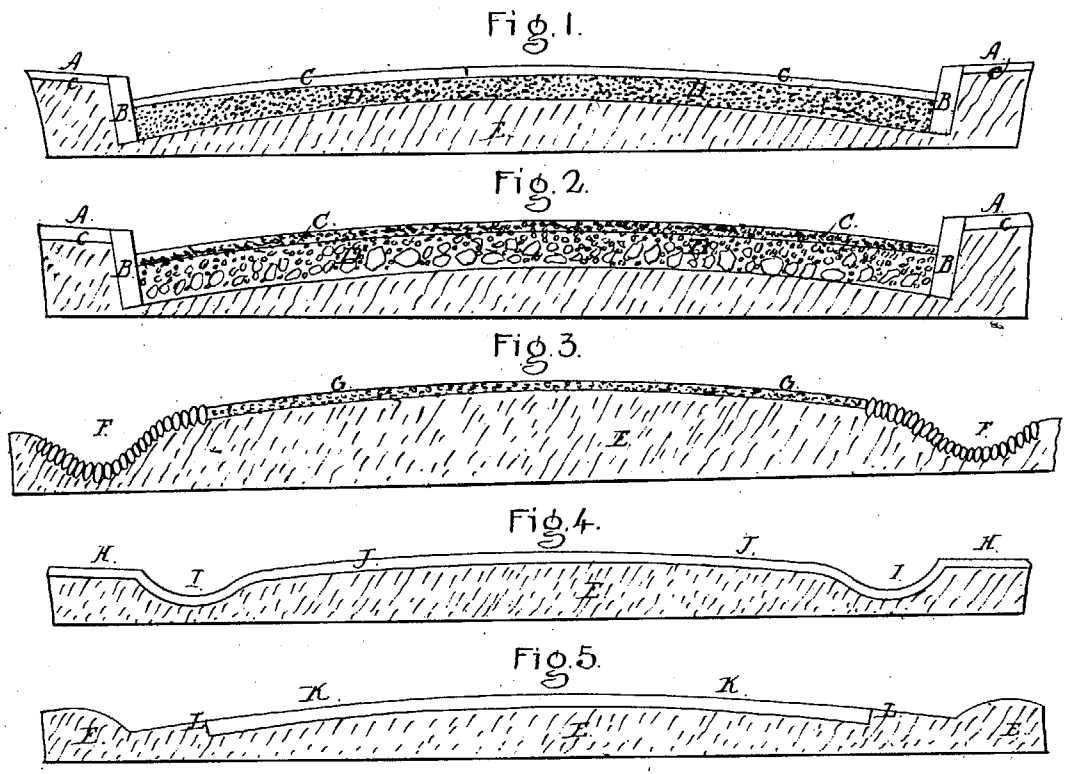
N. PETERS, PHOTO-LITHOGRAPHER, WASHINGTON, D. C Aug. 11. 1834

John Martineau. Elbridge N York

Letters Patent

The schedule referred to in these Letters Patent and making part of the same containing a description in the words of the said John Martineau himself of his improvement being a composition of matter designed for and is applicable to the construction of Roads Streets &c &c which he calls the american plan of Road making.)

To whomsoever these presents shall come

Be it known that I John Martineau of the Town of Elbridge County of Onondaga and State of New York have invented a new and useful composition of matter designed for and applicable to the construction of roads streets and Highways which it is believed constitutes a valuable improvement on the Mc Adam plan and others now in use.. The following is a full description of the composition of matter and mode of using the same in the construction of Roads Streets &c. as invented by me. The composition consists of tar either alone simply or combined with turpentine or other substances of a cohesive nature and sand of different degrees of coarseness combined together or the composition may consist of one quality of sand with tar or other cohesive cement. other varieties of combination may be used according to the exigencies of the case presented by the section of country where a Road on this principle is proposed to be constructed. These varieties may consist of gravel coarse or fine with the residue of the interstices filled by sand. It may here be observed that in all cases the combination of hard substances to be cemented with the tar or other cohesive cement should present the smallest amount in the aggregate of interstices or minute cavities to be filled by cement. Cobble stones may be used, or broken stone such as is used on a McAdam road whatever kind or variety of materials are selected in any particular case the whole should be rendered as compact and uniform as possible. If coarse materials
enter into the composition in any case finer materials should be
combined therewith to fill the vacancies render the mass solid and com
pact and the upper surface smooth and even so as that after its has
been grouted with Tar or other cohesive cement it may present a sur
face quite smooth and uniform
Having described what constitutes the composition intended to be used
in this improved mode of constructing Roads Streets &c over those
now in use which improved mode for the sake of distinction I will
designate as the american plan of Road making. I now proceed
to describe the mode of construction — The same or similarly suit
able modes are to be followed in this case as for the McAdam
Road. It is first to be staked out then graded or graduated. the ne
cessary precautions taken by Culverts side ditches and drains to collect
and carry off the water. The bed of the road is to be rendered firm and
compact by Rolling or other suitable process preserving the shape
the face of the road is intended to have. tho it may be remarked
as this combination is impervious to water much more perfectly than
a McAdam covering it is not necessary to be so much raised or
convex to shed the water as his plan renders proper and necessary
The Road or Street being laid out graded and rendered com
pact and firm is now ready to receive the covering to be cemented
The simplest material in a large section of the United States is
Sand which at the same time forms the best foundation free of
extra cost. The sand is spread over uniformly to the required
thickness. say three inches in ordinary cases. The proper thick
ness will somewhat depend on the nature of the soil constituting
the bed of the Road. If it is firm and homogenious not hold
ing water easily then the covering may be thin reduced to a
minimum — In a word the cover to be cemented may
be in thickness of from one inch to six according to circumstances,
the cover being put on and shaped correctly extending to the side
ditches if necessary and even to form side walks it is ready to be cemented. Fair weather should be selected for this operation
If tar alone is used and in a warm Latitude it may be prop-
er to boil it a little to diminish its fluidity, and prevent its
yielding to ordinary weights. Though it is believed that raw
pure tar will with the sand, or sand combined with other
hard material form a sufficiently firm hard compact mass to
resist injurious impression from the impinging force of wheels or hor-
ses feet and leave unimpaired its character for great durabil-
ity of wear still it may be found useful to boil or heat the
tar to a suitable degree as a means of making it pervade the
whole mass to be cemented more readily and effectually than
when cold or in its natural raw state. among others this method
may be employed to distribute the cement over the face of the road
viz. a Cart may be provided with a reservoir of tar and a
perforated Cylinder laying near the face of the Road horizontally
connected with the reservoir. The communicating tube between
the reservoir and the perforated Cylinder provided with a cock
or stopper. Now the reservoir being supplied it may be moved
by a Horse to a suitable place to begin the process of cementing
the face of the Road. Then the cock being turned the fluid
descends to the perforated cylinder and passing out of the numer-
ous orifices or holes is let on to the face of the road in the required
quantity the whole concern moving gradually along depositing
as much as the face of the Road will absorb till it is saturated
quite to the extreme upper surface. If after having pene-
trated once any part on examination is found to be deficient it
must be supplied. The perforated Cylinder may be long enough
to extend across the Road if it be narrow, or the whole width of
the road may be divided into several spaces or swaths and each
in succession be cemented. The Wheels of the Cart may rest on
Planks to prevent them from indenting the surface. Other
methods may be adopted to put on the cement. Vessels some-
thing like the Watering Pot carried by hand may be made use of. others may suggest themselves. It is by no means a
difficult operation
Side walks in Cities and Towns and footways in villages and
Country places walks in pleasure ground and parks may also be
made on this plan. The accompanying drawing shows some of the modes
or forms according to which roads and Streets may be constructed. In
Fig 1. & Fig 2. A A are side walks supposed to be made of the same
materials as the covering of the carriage way. B.B are curb stones
C in figure 1 represents a thin covering over the broken or rubble stone
of a McAdamized Street E represents the natural earth in all
the Figures CC in Fig 2. represents the covering to consist of pebbles
gravel and sand all cemented over D.D a mass of Cobble stone
gravel and sand forming the Bed of the Street. In Fig 3. G.G
represent the cemented covering to consist of pebbles gravel and sand
about three inches thick FF represents side gutters paved with com
mon cobble stone. The road in this fig. is raised pretty high and
is supposed to be located on a spungy or wet soil. Fig 4 may
represent a street or Road H.H the side walks I.I gutters J.J the
carriage way of the Street or Road covered continuously with the cemen-
ted sand Fig 5. represents a common Road where the carriage
way only is covered with the cemented composition represented by K
K and terminating at L.L. In this case the side ditches are formed
in the common soil which overlaps a little the ends of the cemented cov
er to protect it from abrasion at the edges. This is the cheapest form
of Road. It is proper to remark that in some situations such as
Cities the bed or substratum of the Street or road may be made of cemented
materials such as sand and Gravel cemented with Hydraulic lime
or any other common cement none of which will answer well for
the covering surface of the road being of a nature too friable. but by
being covered in the way here proposed may form a road of addition
al value and durability — What I claim as my invention
and improvement is the application of coal [illegible] or any of that
class of [illegible] [illegible] [illegible] reduced before use to a fluid

597 state and that state used as a cement to apply to and combine with Sand Gravel Pebbles Pulverized Stone such as used for a Mc Adam Road or cobble stone the interstices of coarser materials being in all cases filled as well as may be with Sand and gravel and cemented with tar or turpentine to form the wearing face or surface of Streets Roads &c in the manner described in this specification however the same may be modified or varied in practice I also claim the application of the before mentioned cohesive substances combined with sand or other material to the lining of Canals raceways flooring reservoirs Cisterns &c &c in all of the varied forms which practice may suggest however modified or varied Witnesses
James Getty
H Martineau John Martineau Exd
W.J.C

[704 to 85]